(12) United States Patent
Murnane, Jr.

(10) Patent No.: US 7,874,195 B2
(45) Date of Patent: Jan. 25, 2011

(54) LIQUID PROVING SYSTEM

(75) Inventor: Robert M. Murnane, Jr., Vincentown, NJ (US)

(73) Assignee: Pemberton Fabricators, Inc., Rancocas, NJ (US)

(*) Notice: Subject to any disclaimer, the term of this patent is extended or adjusted under 35 U.S.C. 154(b) by 475 days.

(21) Appl. No.: 12/058,697

(22) Filed: Mar. 29, 2008

(65) Prior Publication Data
US 2009/0188298 A1    Jul. 30, 2009

Related U.S. Application Data

(60) Provisional application No. 61/023,613, filed on Jan. 25, 2008.

(51) Int. Cl.
*G01F 25/00* (2006.01)
(52) U.S. Cl. ........................................ 73/1.31
(58) Field of Classification Search .................. 73/1.31
See application file for complete search history.

(56) References Cited

U.S. PATENT DOCUMENTS

| | | | |
|---|---|---|---|
| 2,050,800 A | | 8/1936 | Lane et al. |
| 2,792,705 A | * | 5/1957 | Barrett, Jr. ................ 73/1.19 |
| 3,826,291 A | * | 7/1974 | Steffens ..................... 141/59 |
| 4,033,190 A | | 7/1977 | Hudspeth |
| 4,106,328 A | * | 8/1978 | Neeff ........................ 73/1.18 |
| 4,507,952 A | * | 4/1985 | Mathieu ..................... 73/1.19 |
| 5,284,046 A | | 2/1994 | Jensen et al. |
| 5,297,423 A | * | 3/1994 | Keating et al. ............. 73/49.2 |

OTHER PUBLICATIONS

Richard Jordan, Advances in Retail Motor Fuel Meter Calibration, PMAA Journal, Aug. 2001, 4 pages (reprint), The Petroleum Marketers Association of America, Arlington, VA, USA.
Seraphin Slip-On Calibration Unit / Operating and Maintenance Instructions, Jul. 2004, 9 pages, Pub E91-4041, Seraphin Test Measure, A Division of Pemberton Fabricators, Inc, Rancocas, NJ, USA.

(Continued)

*Primary Examiner*—John Fitzgerald
(74) *Attorney, Agent, or Firm*—Philip O. Post (57) ABSTRACT

A liquid proving system is provided with a bottom drain liquid prover draining into a holding tank. The fill opening of the prover has a prover fill opening self sealing assembly that remains closed except when a nozzle used to pump liquid into the prover is pushed through the opening of the prover fill opening self sealing assembly. The prover fill opening self sealing assembly may comprise a nozzle sealing gasket and a nozzle removed self seal assembly. There is a vapor conduit connecting the interior of the prover in the region of the fill opening and the interior of the holding tank to form a saturated vapor environment in the prover and holding tank from the vapors emitted from liquid in the holing tank. When liquid is pumped into the prover evaporation of the liquid being pumped into the prover, and release of vapors from the prover, is inhibited due to the saturated vapor environment in the prover, which results in a more accurate prover measurement of liquid pumped into the prover.

10 Claims, 10 Drawing Sheets

OTHER PUBLICATIONS

Seraphin Motor Fuel Calibration Trailer / Operating and Maintenance Instructions, Jul. 2004, 14 pages, Pub E91-4044, Seraphin Test Measure, A Division of Pemberton Fabricators, Inc, Rancocas, NJ, USA.

Seraphin Gasoline Calibration Trailer / Operating and Maintenance Instructions, Jul. 2004, 11 pages, Pub E91-4043, Seraphin Test Measure, A Division of Pemberton Fabricators, Inc, Rancocas, NJ, USA.

Seraphin Slip-On Unit with Prover / Operating and Maintenance Instructions, Jan. 2005, 11 pages, Pub E91-4044, Seraphin Test Measure, A Division of Pemberton Fabricators, Inc, Rancocas, NJ, USA.

Richard C. Jordan, Design, Calibration and Operation of Field Standard Test Measures, Class #4040, Aug. 2000, 5 pages, Seraphin Test Measure, A Division of Pemberton Fabricators, Inc, Rancocas, NJ, USA.

Hydraulic Accessories Catalog #02080105 / 4.06, 2003, pp. 125 and 126, HYDAC Technology Company, Rancho Cucamonga, CA, USA.

Volumetric Calibration Unit Boots Productivity and Safety, 2004, 1 page, Seraphin Test Measure, A Division of Pemberton Fabricators, Inc, Rancocas, NJ, USA.

Volumetric Test Measures Prevent Loss of Liquid Assets, 2004, 1 page, Seraphin Test Measure, A Division of Pemberton Fabricators, Inc, Rancocas, NJ, USA.

Series J Heavy Duty Prover, 2004, 2 pages, Seraphin Test Measure, A Division of Pemberton Fabricators, Inc, Rancocas, NJ, USA.

Featured Product / New Slip-On with 60 Gallon Prover, 2004, 1 page, Seraphin Test Measure, A Division of Pemberton Fabricators, Inc, Rancocas, NJ, USA.

Motor Fuel Calibration Trailer, 2004, 2 pages, Seraphin Test Measure, A Division of Pemberton Fabricators, Inc, Rancocas, NJ, USA.

Slip-on Heavy Duty Measures & Provers, 2004, 2 pages, Seraphin Test Measure, A Division of Pemberton Fabricators, Inc, Rancocas, NJ, USA.

Motor Fuel Calibration Truck, 2004, 1 page, Seraphin Test Measure, A Division of Pemberton Fabricators, Inc, Rancocas, NJ, USA.

* cited by examiner

LIQUID PROVING SYSTEM

CROSS REFERENCE TO RELATED APPLICATIONS

This application claims the benefit of U.S. Provisional Application No. 61/023,613, filed Jan. 25, 2008, hereby incorporated by reference in its entirety.

FIELD OF THE INVENTION

The present invention relates to bottom drain liquid proving systems, including provers used to calibrate volume meters on gasoline and diesel pumps at filling stations.

BACKGROUND OF THE INVENTION

Volume meters on liquid dispensing pumps, such as gasoline and diesel pumps at filling (gas) stations or gas bars, require periodic calibration measurements to ensure that the volume displayed on a pump's meter accurately reflects the volume of liquid that is being dispensed from the pump. Significant overcharging (or undercharging) can result when the error in a pump's volume meter reading is beyond an allowable tolerance.

Figure 1:
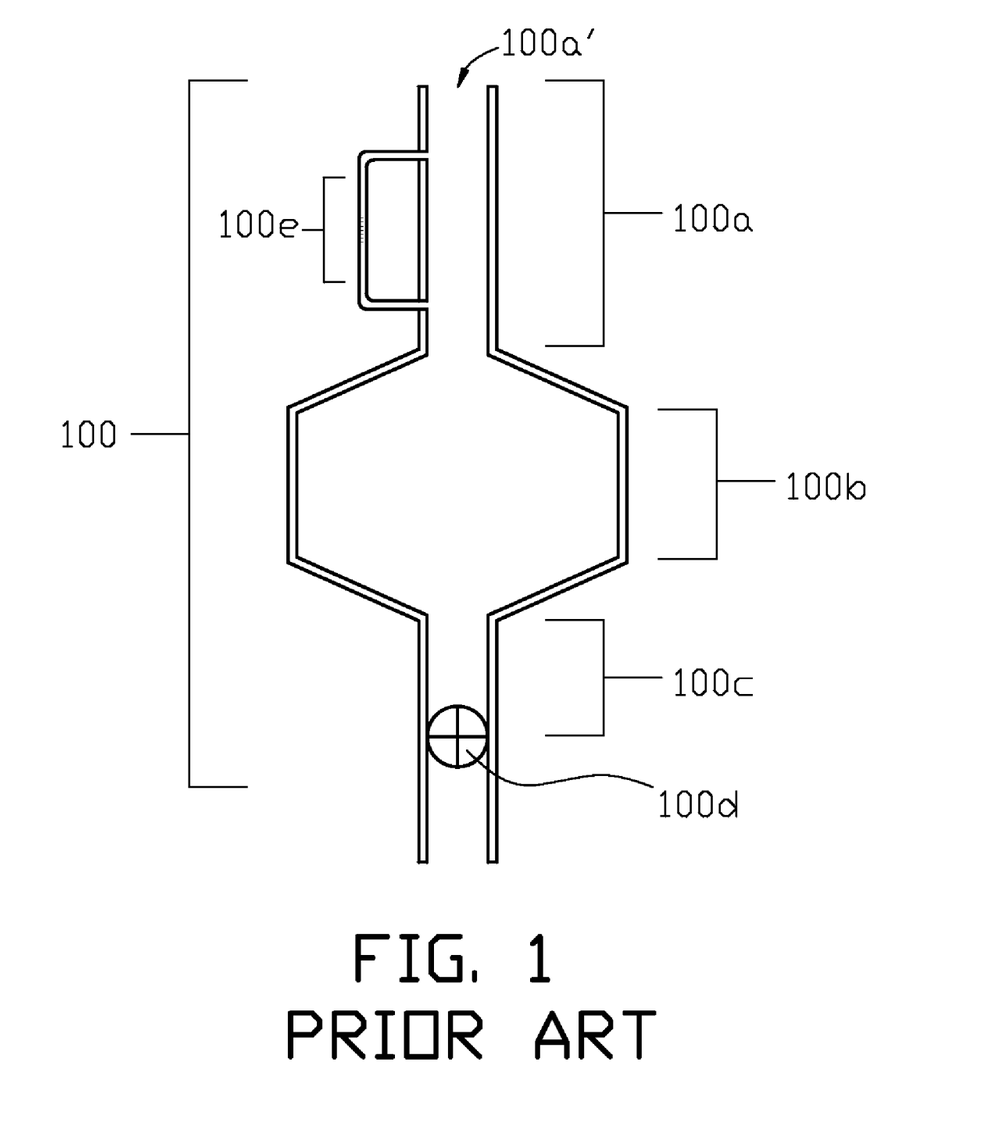
FIG. 1 is a simplified cross section elevation view of a typical bottom drain liquid prover.

A bottom drain prover can be used to perform the calibration measurement for the pumps at a filling station. As shown in FIG. 1 bottom drain prover 100 typically has a narrow upper neck 100a with fill opening 100a' for filling the prover with liquid from the liquid dispensing pump, a wider diameter body section 100b for accumulating and holding the bulk of the liquid pumped into the prover, and a narrow drain section 100c with a drain opening. Drain valve 100d is provided for controlling release of the accumulated liquid from the prover. The prover's volume meter can be a gauge glass tube 100e that has its interior volume connected to the interior volume of neck 100a. The gauge glass is marked along its height with a neck scale that reflects the capacity of liquid in the prover when drain valve 100d is closed and the prover is filled with liquid up to the neck region of the prover. The nominal capacity of the prover, and deviations there from, are marked on the scale using standards that are established by the applicable standards organization, such as, in the United States, the National Institute of Standards and Technology, or in Canada, Measurement Canada's Calibration Services Laboratory. If the nominal capacity of the prover is, for example, five gallons (or nominal conversion to twenty litres), five gallons (twenty litres), as measured by the pump's meter, of liquid from the dispensing pump is pumped into the prover, and the prover's calibrated neck meter is read to determine the deviation, if any, from five gallons (twenty litres). If the deviation exceeds an allowable tolerance, the pump's meter can be adjusted so that the pump's meter indicates a volume of liquid within the allowable tolerance as measured by the prover's neck scale. In an alternative meter calibration method, liquid may be pumped from the dispensing pump into the prover until the neck scale indicates that the prover is filled to nominal capacity. The pump's meter can then be recalibrated, if necessary, to read the pumped nominal capacity of liquid in the prover. One suitable bottom drain prover is a SERAPHIN brand special J prover, which is available from Pemberton Fabricators, Inc., Rancocas, N.J., USA.

Typically when provers are used to calibrate gas and diesel pumps at a filling station, one or more provers have their bottom drain(s) connected to a common or dedicated drain holding tank(s) so that after each filling of a prover, the prover can be drained for another filling. The combination of prover(s) and drain tanks(s) can be installed on a vehicle, or mounted on a trailer hitched to a vehicle for convenient transport.

Figures 2A, 2B, 2C, 2D, 2E:
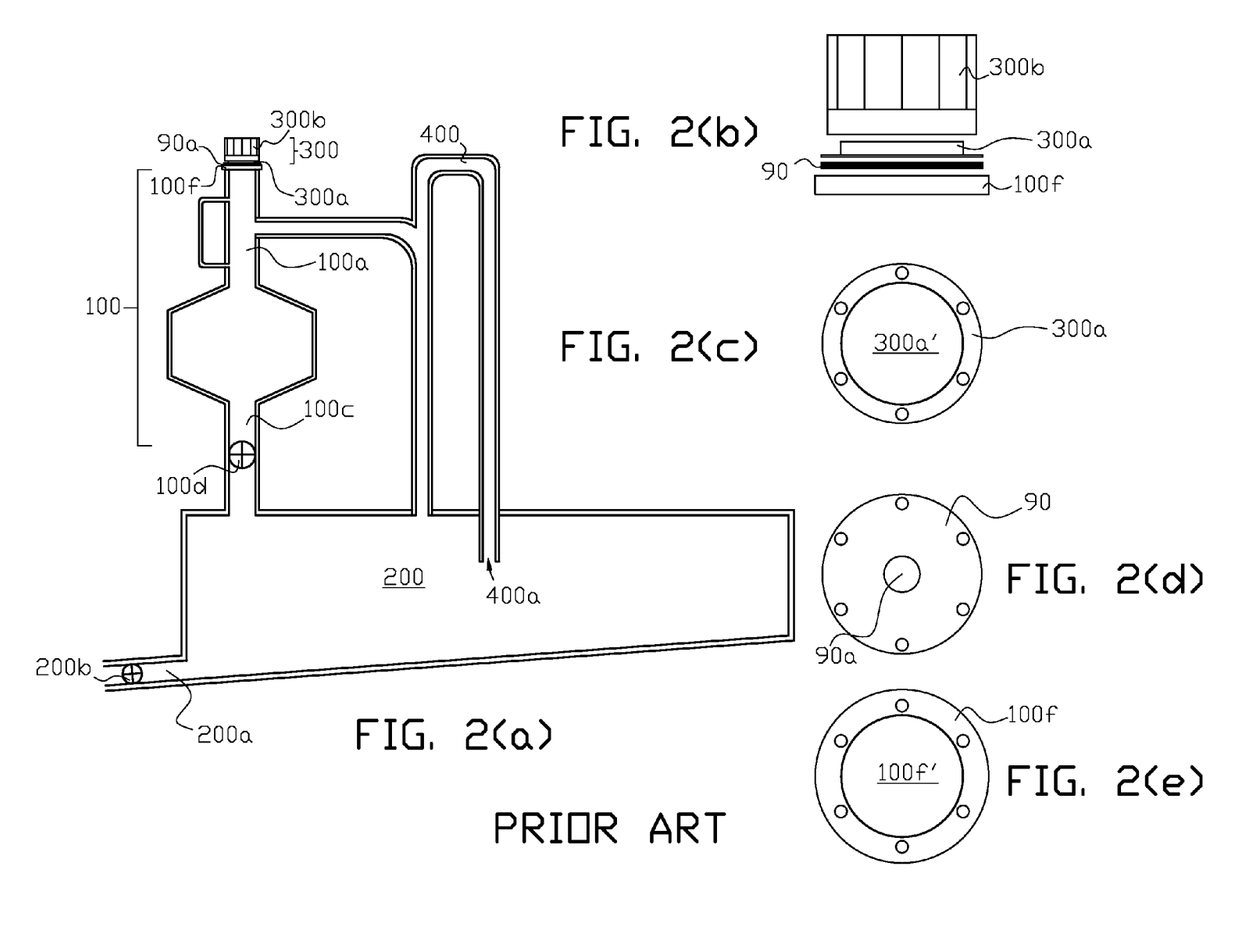
Figure 3:
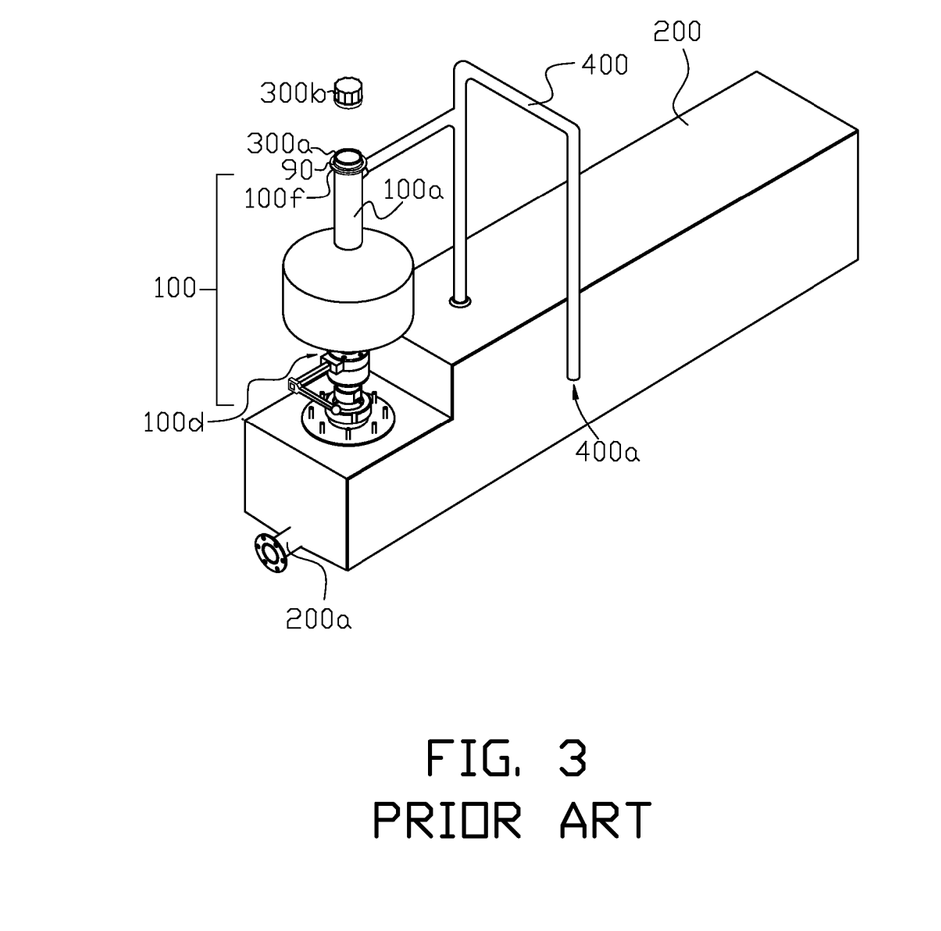
FIG. 3 is an isometric view of a typical bottom drain liquid prover connected to a holding tank.

As shown in FIG. 2(a) and FIG. 3 a mobile proving system may comprise holding tank 200 that can be structurally connected to a wheeled trailer or mounted on a truck bed (not shown in the figures) for selective attachment to a vehicle for transport to sites, such as gas stations where gasoline or diesel fuel pumps, or more generally, meter devices, require calibration. Prover 100 is similar to the prover shown in FIG. 1. Drain section 100c is connected to holding tank 200 so that opening drain valve 100d allows liquid in the prover's internal volume to drain into the holding tank. Tank discharge line 200a can be connected to a suitable device, such as butterfly valve 200b for controlling release of accumulated liquid from the holding tank. Vent conduit 400 connects the interior volume of neck 100a and tank 200 to the ambient environment surrounding the tank (atmosphere) via vent opening 400a. A breather cap assembly 300 can be provided for preventing foreign objects or liquids, such as rain, from entering fill opening 100a' when the prover is not being used. As shown in FIG. 2(b) the breather cap assembly may comprise bayonet flange 300a suitably attached to the opening of the prover neck, for example, by neck flange 100f at the fill opening of the prover and nozzle sealing gasket 90, and breather cap 300b, which can be removably connected to the bayonet flange by a twisting motion. A suitable breather cap assembly comprises ELF 3 series filler breather (breather cap part no. 02080124 and associated bayonet flange part) available from HYDAC Technology Corporation, Bethlehem, Pa., USA. As seen in FIG. 2(c) through 2(e), through opening 90a in nozzle sealing gasket 90 is smaller than the through openings 300a' and 100f in bayonet flange 300a and prover's neck flange 100f. Further opening 90a is sized to form a tight fit around the exterior of a pump's nozzle that is inserted through the opening. Typical nozzle sealing gasket 90 comprises a flexible material, such as a rubber composition, at least around through opening 90a so that the gasket seals around the nozzle inserted in through opening 90a.

In operation of the bottom drain prover system shown in FIG. 2(a) and FIG. 3, with breather cap 300b removed as shown in FIG. 3, and prover drain valve 100d closed, a liquid dispensing pump's nozzle is inserted into fill opening 100a' in neck 100a, that is, inserted through through opening 300a' in bayonet flange 300; through opening 90a in nozzle sealing gasket 90; and through opening 100f in neck flange 100f, to fill the prover with liquid via the pump. Vapor from the liquid filling the prover can evaporate into the neck volume of the prover and connected vent conduit 400 during the filling process. If the liquid is highly volatile, the volume of liquid lost in the vapor can introduce a significant error in the measured volume in the prover that is not attributable to the dispensing pump's meter calibration. In other words the dispensing pump's meter may be within allowable tolerance while the prover system is indicating lower volume of pumped liquid to the prover due to evaporation of the liquid while filing the prover. Further after the pump's nozzle is withdrawn from the fill opening and the volume of liquid accumulated in the prover is released into the holding tank by opening drain valve 100d, some of the vapor/air mixture suctioned up through vent conduit 400 escapes to atmosphere through fill opening 100a' while ambient air is drawn into the holding tank through vent opening 400a.

Further the operator of the prover who inserts the nozzle from the dispensing pump into the fill opening of the prover will be in the vicinity of potentially hazardous gas or diesel vapors while the prover is being filled with liquid.

Therefore there is need for a liquid proving system that will prevent the release of vapors from the liquid being pumped into the prover so that the volume of liquid being pumped into the prover is not reduced by vapor losses prior to measurement of the volume with the prover's gauge, and for a liquid proving system that will not release vapors from the liquid being pumped into the prover in the vicinity of the operator of the prover.

BRIEF SUMMARY OF THE INVENTION

In one aspect the present invention is apparatus for, and process of, measuring a volume of liquid with a bottom drain liquid proving system. A bottom drain prover has an upper section for receiving the liquid, an intermediate section for accumulating liquid pumped into the prover, and a bottom drain section for draining accumulated liquid from the prover into a holding tank. A prover gauge is in communication with the interior volume of the prover to measure a volume of liquid pumped into the prover. A vapor conduit is provided between the upper section of the prover and the interior volume of the holding tank to establish a saturated vapor environment in the interior volume of the prover. A prover fill opening self sealing assembly is disposed over the opening in the upper section of the prover through which liquid is pumped into the prover. The prover fill opening self sealing assembly has a self sealing opening that opens when a liquid dispensing nozzle is pushed against the self sealing opening and forms a substantially vapor tight seal around the nozzle. A vent connects the interior volume of the holding tank to atmosphere.

In some examples of the invention, the prover fill opening self sealing assembly may comprise a nozzle sealing gasket for forming the substantially vapor tight seal around the nozzle, and a nozzle removed self seal assembly containing a self sealing opening.

In some examples of the invention, the nozzle removed self seal assembly may comprise an annular disk and a flapper door that covers the annulus of the annular disk except when the liquid dispensing nozzle is pushed against the flapper door to penetrate through the annulus into the interior of the upper section of the prover. The flapper door may be attached to a self-closing spring loaded spring attached to the annular disk.

The above and other aspects of the invention are set forth in this specification and the appended claims.

BRIEF DESCRIPTION OF THE DRAWINGS

The foregoing brief summary, as well as the following detailed description of the invention, is better understood when read in conjunction with the appended drawings. For the purpose of illustrating the invention, there is shown in the drawings exemplary forms of the invention that are presently preferred; however, the invention is not limited to the specific arrangements and instrumentalities disclosed in the following appended drawings:

FIG. 2(*a*) is a simplified cross section elevation view of the bottom drain liquid prover shown in FIG. 1 with the prover's drain connected to a holding tank.

FIG. 2(*b*) is a side elevation view of a typical breather cap assembly that can be used with the prover system shown in FIG. 2(*a*).

FIG. 2(*c*), FIG. 2(*d*) and FIG. 2(*e*) are top views of a bayonet flange used with the breather cap assembly; nozzle sealing gasket; and prover's neck flange, respectively.

FIG. 8(*a*), FIG. 8(*b*) and FIG. 8(*c*) illustrate components of the through opening self sealing assembly shown in FIG. 7.

FIG. 9(*a*) and FIG. 9(*b*) are side elevation connected and exploded views, respectively, of one example of the prover fill opening self sealing assembly and breather cap assembly used with one example of the bottom drain liquid proving system of the present invention.

DETAILED DESCRIPTION OF THE INVENTION

Figure 4:
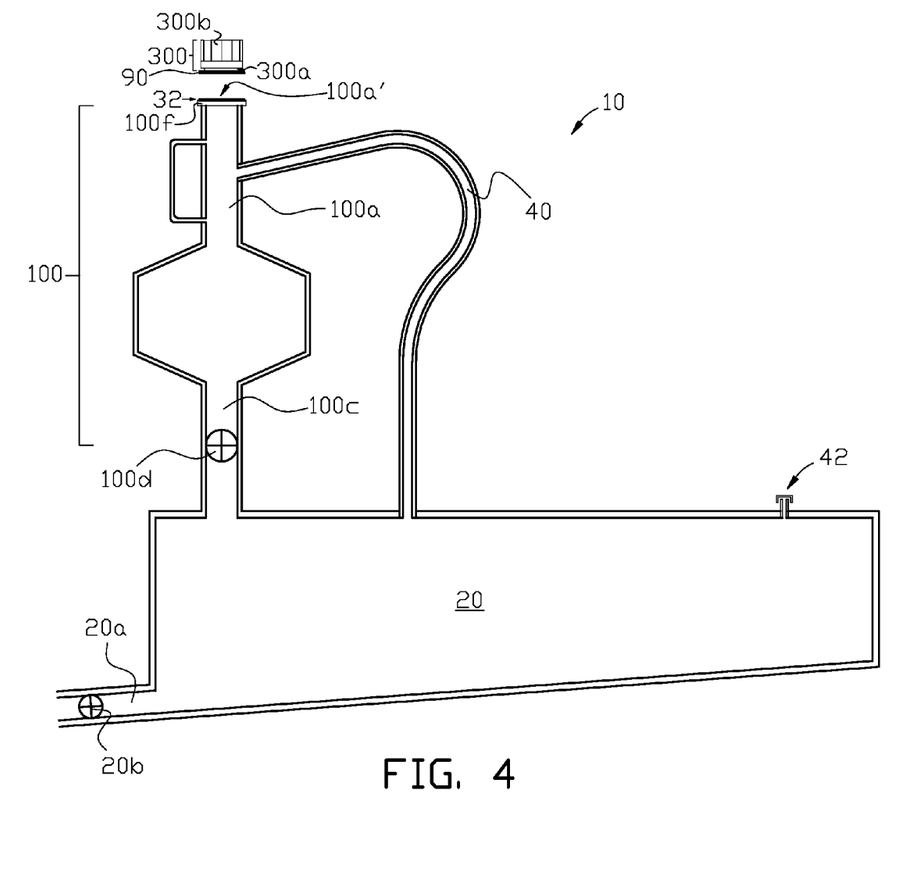
FIG. 4 is a simplified cross section elevation view of one example of the bottom drain liquid proving system of the present invention.

There is shown in FIG. 4 one non-limiting example of the liquid prover system 10 of the present invention. Bottom drain prover 100, which is substantially the same as the prover described above, is installed near a first end of holding tank 20 with the interior of the prover's drain section 100*c* connected to the interior of holding tank 20 via drain valve 100*d*. The prover gauge that measures the volume of liquid in the prover may be of any type, such as a gauge glass, an electromechanical gauge, or an electronic gauge. Vapor conduit 40 connects the interior volume of neck 100*a* and tank 20 so as to form a closed path for vapors in prover 100 and tank 20. The combination of nozzle sealing gasket 90 and nozzle removed self seal assembly 32 minimizes the release of vapors from fill opening 100*a*' regardless of whether the dispensing pump's nozzle is inserted into the fill opening. Ambient air vent 42 allows ambient (atmospheric) pressure equalization in the holding tank as the tank is filled with liquid drained from the prover, and emptied via the tank's discharge line 20*a* and discharge control valve 20*b*. Vapor conduit 40 may be of any suitable conduit material, including but not limited to, metal or PVC rigid conduit, or of flexible construction, such as a rubber composition hose.

Figure 5:
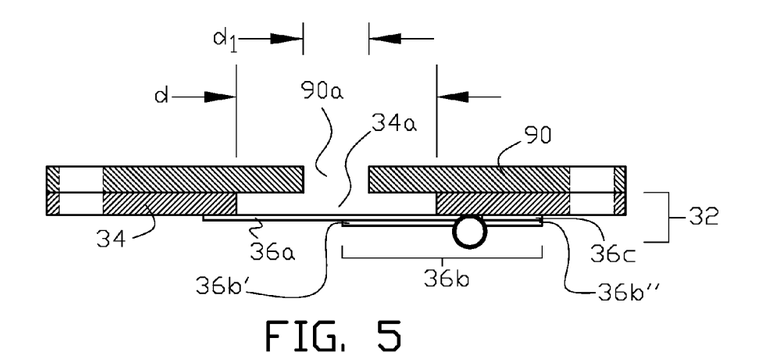
FIG. 5 is one example of a prover fill opening self sealing assembly used in a bottom drain liquid proving system of the present invention.
Figure 6:
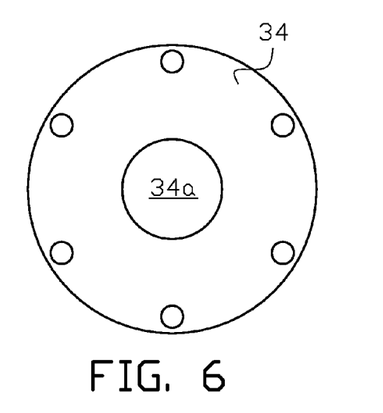
FIG. 6 is one example of a sealing plate used with the nozzle removed self seal assembly shown in FIG. 5.

There is shown in FIG. 5 one non-limiting example of nozzle removed self seal assembly 32 of the present invention. The nozzle removed self seal assembly comprises sealing plate 34 (FIG. 6), which is in the shape of an annular disk with an annulus or through opening 34*a*, and through opening self sealing assembly 36 (FIG. 7 with sealing plate 34 shown in dashed lines), which opens when a dispensing pump's nozzle is inserted in the through opening and closes when the nozzle is withdrawn from the through opening. The diameter of the through opening is identified as "d" in FIG. 5. Generally through opening 34a is limited in size to the outer dimension of the nozzle to be inserted into the through opening with additional clearance as required for nozzle insertion into the through opening.

Figure 13:
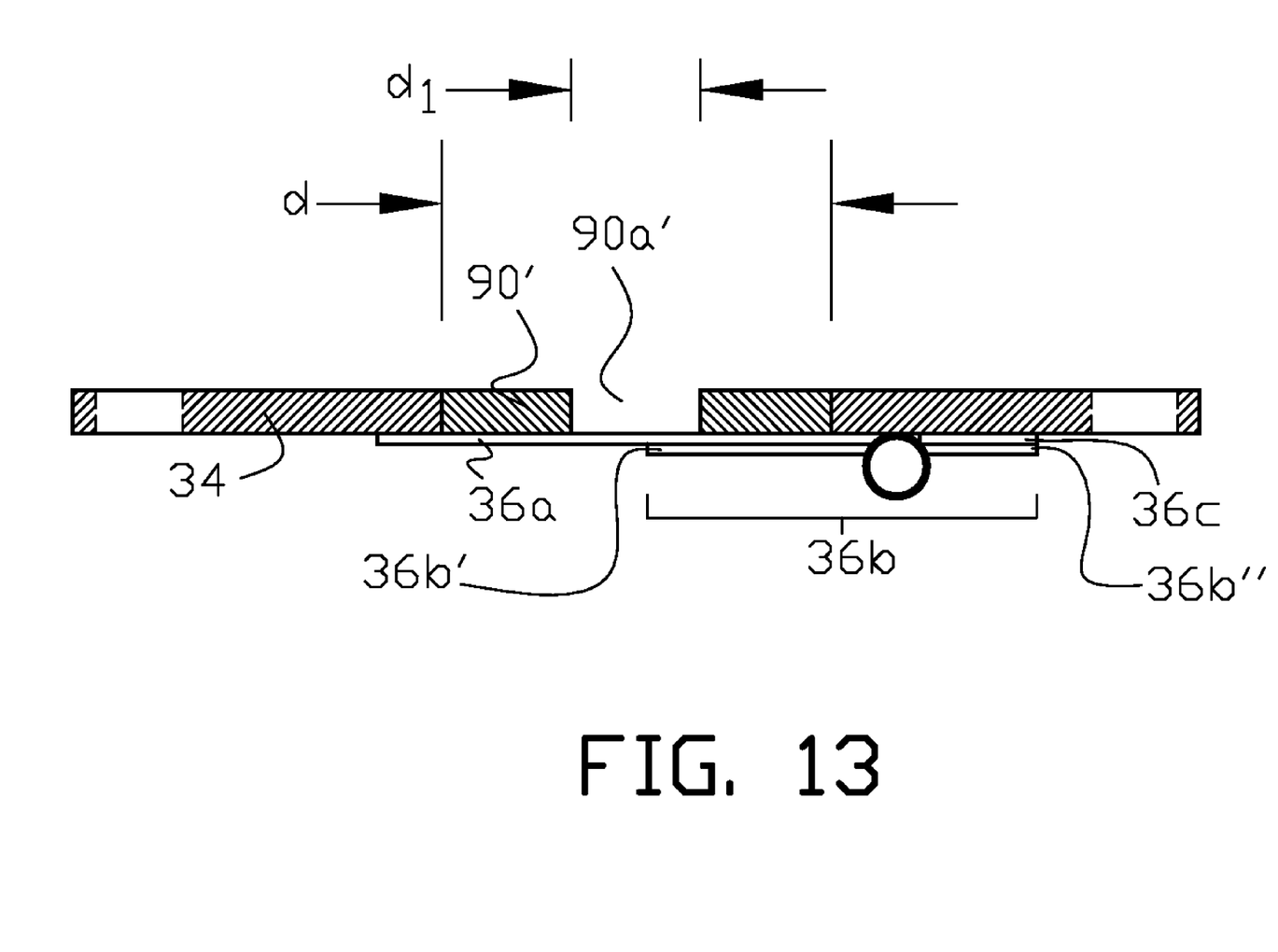
FIG. 13 is one example of a prover fill opening self sealing assembly used with the liquid proving system of the present invention.

In the non-limiting example of the invention as shown, for example, in FIG. 5, nozzle sealing gasket 90 is seated adjacently above nozzle removed self seal assembly 32 to form a combination prover fill opening self sealing assembly wherein the nozzle sealing gasket 90 primarily prevents release of vapors through the fill opening when a nozzle is inserted in opening 90a in gasket 90, and closed flapper door 36a in the nozzle removed self seal assembly 32 prevents release of vapors through the fill opening when a nozzle is not inserted through opening 34a in sealing plate 34. Nozzle sealing gasket 90 has opening 90a, which is sufficiently large enough (shown as diameter "$d_1$" in FIG. 5) to push a nozzle through while substantially maintaining a vapor seal between the perimeter of opening 90a and the exterior section of the nozzle pushed through opening 90a. In other examples of the invention, the nozzle sealing gasket may be offset and separated from the nozzle removed self seal assembly. In other examples of the invention, the nozzle sealing gasket and nozzle removed self seal assembly may be combined into a unified prover fill opening self sealing assembly. By way of example and not limitation, as shown in FIG. 13, nozzle sealing gasket 90' may be of an annular ring shape and positioned within through opening 34a.

Figure 7:
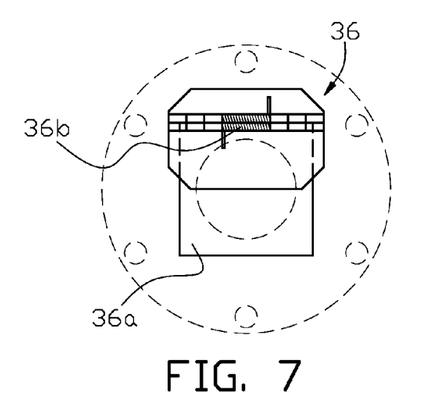
FIG. 7 is one example of a through opening self sealing assembly used with the nozzle removed self seal assembly shown in FIG. 5.
Figure 8A:
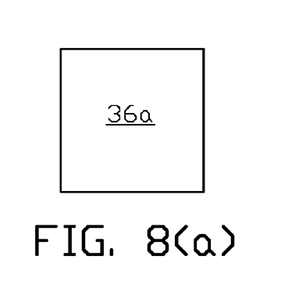
Figures 8B, 8C:
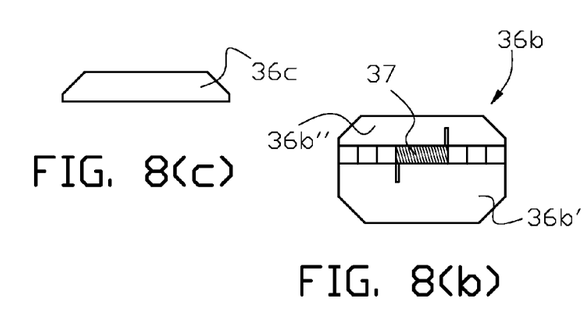

FIG. 7 illustrates one non-limiting example of a through opening self sealing assembly 36 of the present invention comprising flapper door 36a, self-closing spring loaded hinge 36b, and shim 36c as shown in FIG. 8(a), FIG. 8(b) and FIG. 8(c), respectively. Flapper door 36a is located on the side of sealing plate 34 that faces the interior of the prover's neck volume, and positioned so that the flapper door is seated over the entire through opening 34a when a nozzle is not positioned in the through opening, thus providing a seal to prevent release of vapors through the fill opening to atmosphere. Flapper door 36a is suitably attached to first wing 36b' of self-closing spring loaded hinge 36b while the second wing 36b" is suitably attached to shim 36c, which, in turn, is suitably attached to sealing plate 34 as best seen in FIG. 5. One non-limiting method of attachment may be tack welding. The first and second wings are suitably connected to spring 37 of the self-closing spring loaded hinge. A suitable, but non-limiting, self-closing spring loaded hinge is McMaster Carr (Atlanta, Ga., USA) Part No. 15205A36. Generally the thickness of shim 36c is the same as the thickness of flapper door 36a to ensure that the flapper door seats flush against the facing surface of the flapper door sealing plate. Therefore the flapper door ensures that vapors are not released from the neck of prover 100 to atmosphere unless a dispensing pump's nozzle is inserted into the sealing plate's through opening 34a when the prover is being filled with liquid flowing through the nozzle. Inserting the nozzle into the through opening will force the spring loaded flapper door to open against the inserted nozzle. Preferably the diameter of through opening 34a is sufficiently large enough to allow easy passage of the nozzle, or nozzles, intended to be used with the prover, without excess release of vapors though any clearance space between the through opening and the outer diameter of the nozzle. In other examples of the invention, the sealing plate and one or more of the components of the fill opening seal assembly may be combined in a single structural element. While a self-closing spring loaded hinge is used in the above example of the invention, in other examples of the invention, other components may be used to achieve self sealing of the through opening when a nozzle is not inserted into the through opening.

The combination of nozzle sealing gasket 90 and nozzle removed self seal assembly 32 is one non-limiting example of minimizing the release of vapors from fill opening 100a' regardless of whether the dispensing pump's nozzle is inserted into the fill opening. Other examples include a leaf diaphragm through opening self sealing assembly wherein the leaves of the diaphragm are positioned over through opening 34a and remain closed except when a nozzle is pressed against the leaves of the diaphragm to insert the nozzle into neck 100a of the prover. By way of example and not limitation, the leaves may be composed of a flexible material, such as a rubber composition, that bends around the outer perimeter of the nozzle as it is inserted in the through opening. Further, as noted above, the nozzle sealing means and nozzle removed self sealing means may be combined into a unified prover fill opening self sealing assembly.

Ambient air vent 42 (FIG. 4) is generally located near the end of holding tank 20 that is opposite the end near where prover 100 is located. In other examples of the invention two or more ambient air vents may be provided.

Figure 9A:
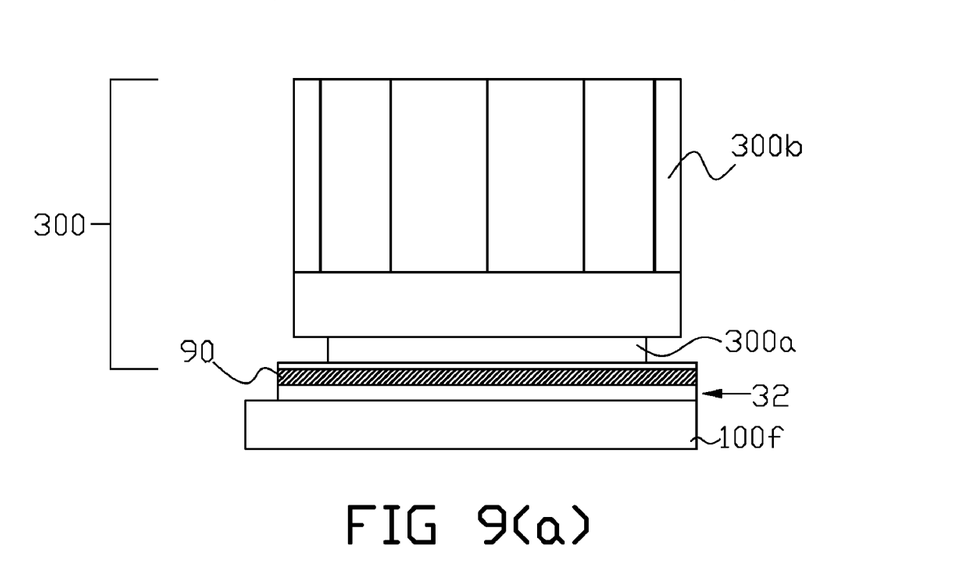
Figure 9B:
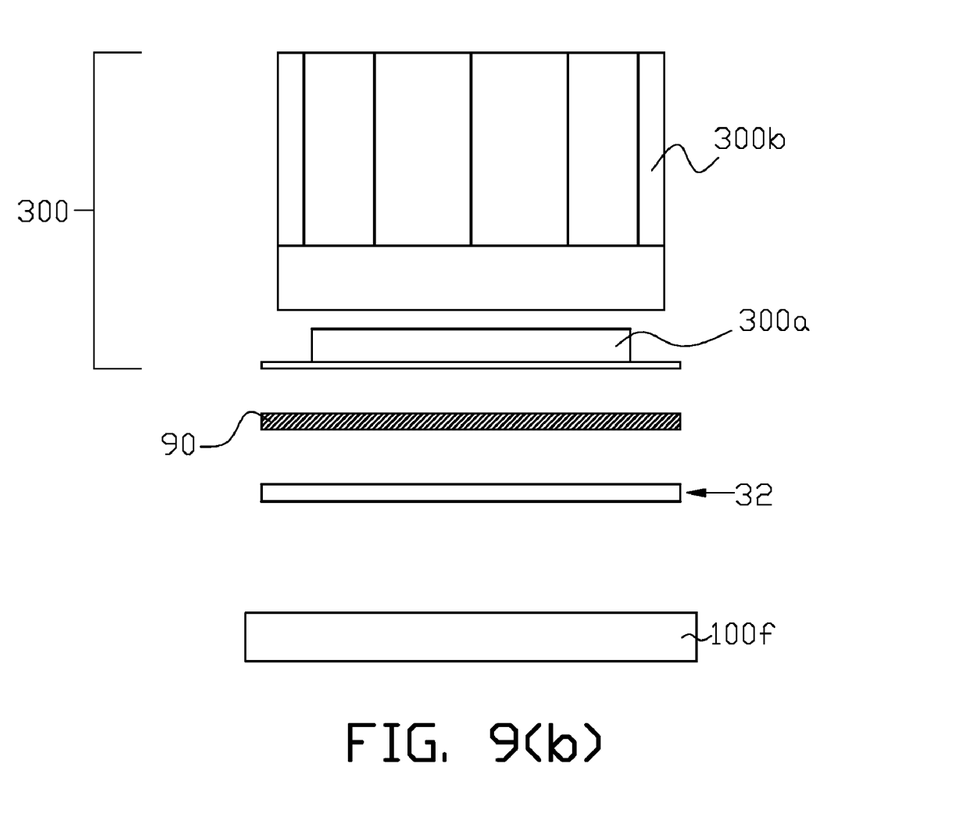

As illustrated in FIG. 4, FIG. 9(a) and FIG. 9(b) breather cap assembly 300 can be disposed over nozzle sealing gasket 90 and nozzle removed self seal assembly 32 when prover 100 is not being used for extended periods, for example, when the prover is being transported between gas stations.

Figure 10:
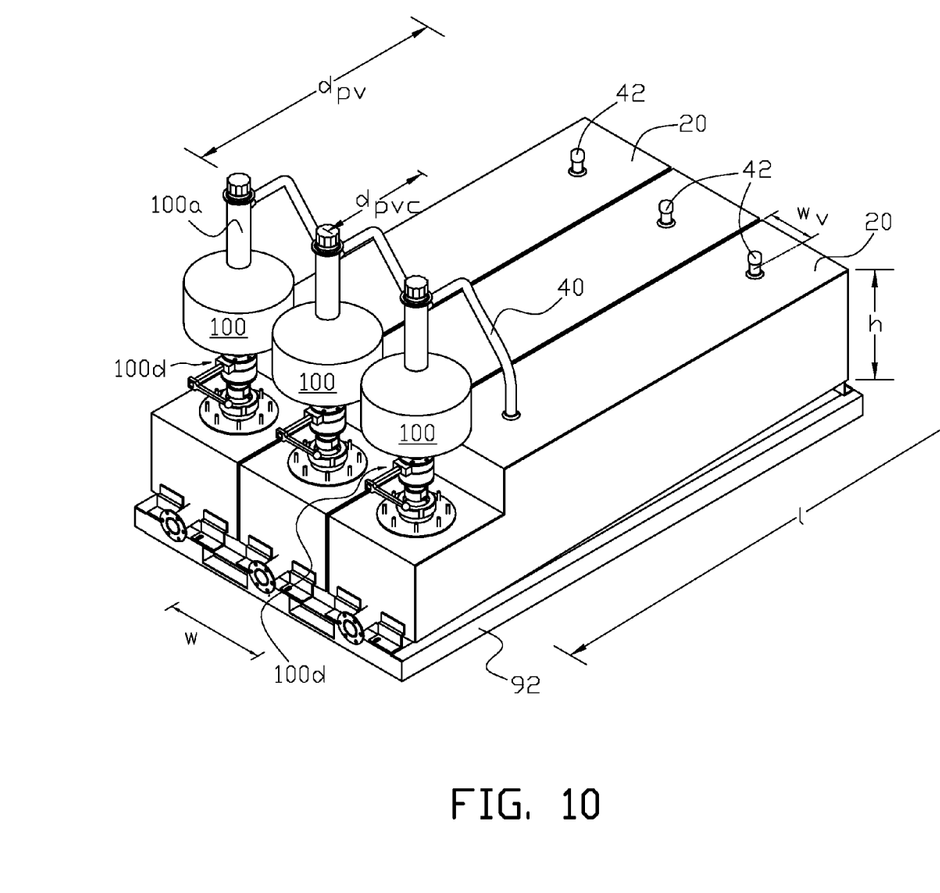
FIG. 10 is an isometric view of another example of the bottom drain liquid proving system of the present invention.

FIG. 10 illustrates another non-limiting example of the liquid prover system of the present wherein three of the liquid prover systems shown in FIG. 4 are connected to common support structure 92, which can be outfitted with wheels to form a wheeled trailer that can be transported between sites for calibration measurement of dispensing pump's meters at each site. The step down ends of holding tanks 20 in FIG. 10 to which provers 100 are connected can be utilized to lower the overall height of the prover to provide more convenient operator access to the top openings and drain valves of the provers. Alternatively the provers and structure support may be installed on a vehicle, such as the flat bed of a pickup truck.

In operation one non-limiting method of using the liquid proving system of the present invention is as follows. If breather cap assembly cap 300 is installed, breather cap 300b is removed and prover 100 is at least once initially filled with liquid from a metering device or pump, for example, by inserting the metering pump's dispensing nozzle into the fill opening and through opening 90a in nozzle sealing gasket 90 and opening 34a in sealing plate 34, and pumping liquid into the prover prior to performing a calibration fill. In a calibration fill, a nominal volume (for example 5.0 gallons or 20.0 litres) of the liquid, as measured by the meter reading on the metering device is pumped into the prover from the dispensing pump. The meter reading is compared with the volume of liquid in the prover as measured by the gauge (neck scale reading) on the prover to determine the degree of error in the meter reading. If the error exceeds an allowable value, the meter can be recalibrated and another calibration fill of the prover can be made to confirm that the recalibration brings the meter within an acceptable tolerance range.

As mentioned above another non-limiting method for a calibration fill is to pump liquid into the prover until the neck scale on the prover reads the nominal capacity, at which time, the meter on the pump can be recalibrated to the nominal capacity.

Figure 11:
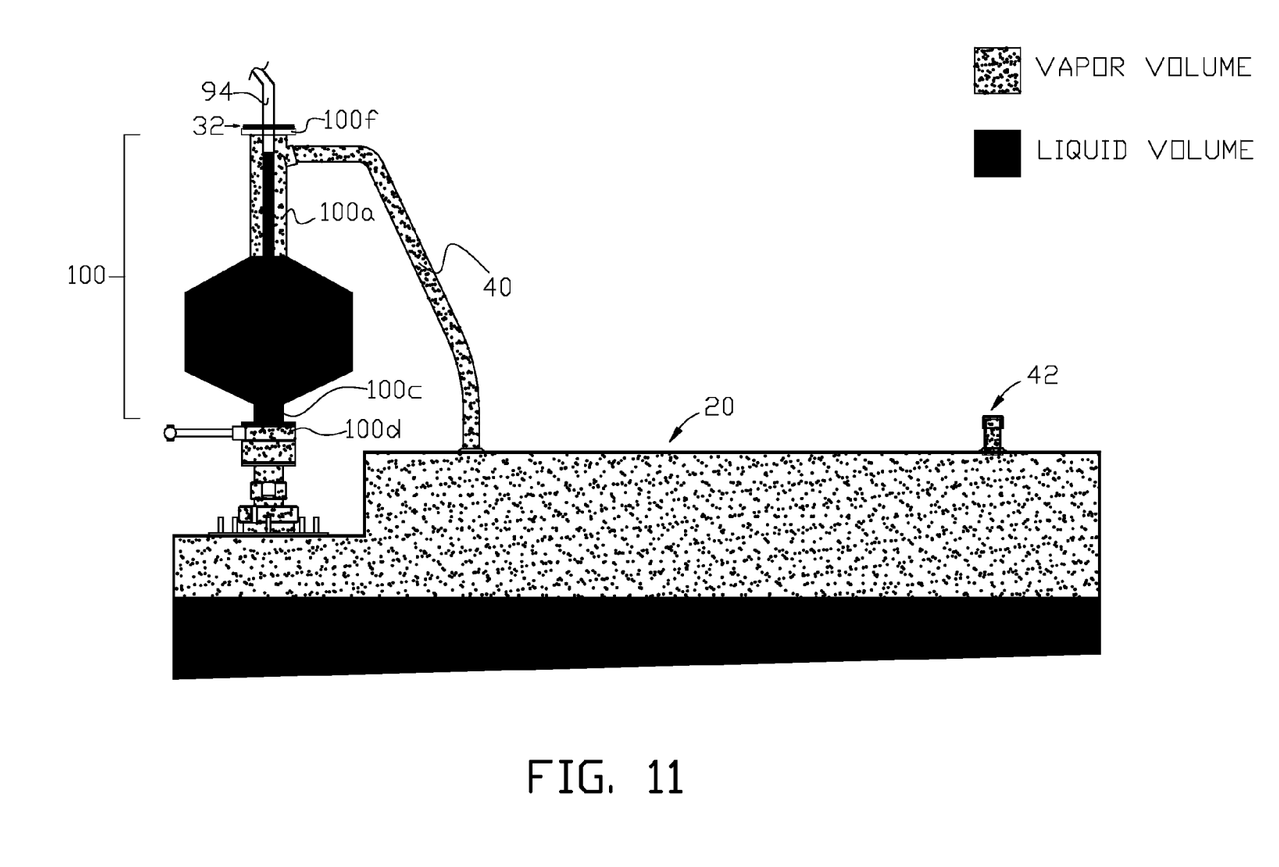
FIG. 11 is a side elevation view of one example of the bottom drain liquid proving system of the present invention illustrating vapor and liquid distribution when the prover is being filled.

The pre-calibration filling of the prover is performed to wet down the internal surfaces of the prover so that the quantity of fluid adhering to these internal surfaces is consistent during repetitive fillings of the prover. Referring to FIG. 11, for each fill of prover 100, inserting nozzle 94 in through opening 34a pushes flapper door 36a open while the release of vapor from the liquid flowing through the nozzle and into the prover is minimized since nozzle sealing gasket 90 and sealing plate 34 block release of vapors to atmosphere through fill opening 100a' and the air (shown in stipple in the figure) in the prover's neck 100a is vapor saturated thanks to vapor conduit 40, which connects the interior volume of the neck with the interior vapor volume of holding tank 20. Since the calibration measurement fill is performed after one or more precalibration fills, vapor saturation of the air in the prover and tank is assured, particularly if the liquid (such as gasoline) has a strong tendency to evaporate. Maintaining a vapor saturated environment inside the prover effectively restricts the vaporization of the volatile liquid. Minimizing evaporation from the volume of liquid pumped into the prover, and release of vapor from the prover, during a calibration fill is important since for a highly volatile liquid such as gasoline, the volume of liquid lost in the release of vapor can be significant. Consequently without controlling vapor release as with the liquid prover system of the present invention, the prover's gauge reading may incorrectly attribute a volumetric error to the calibration of the meter in the liquid dispensing device that actually results from vapor loss during filling of the prover.

Figure 12:
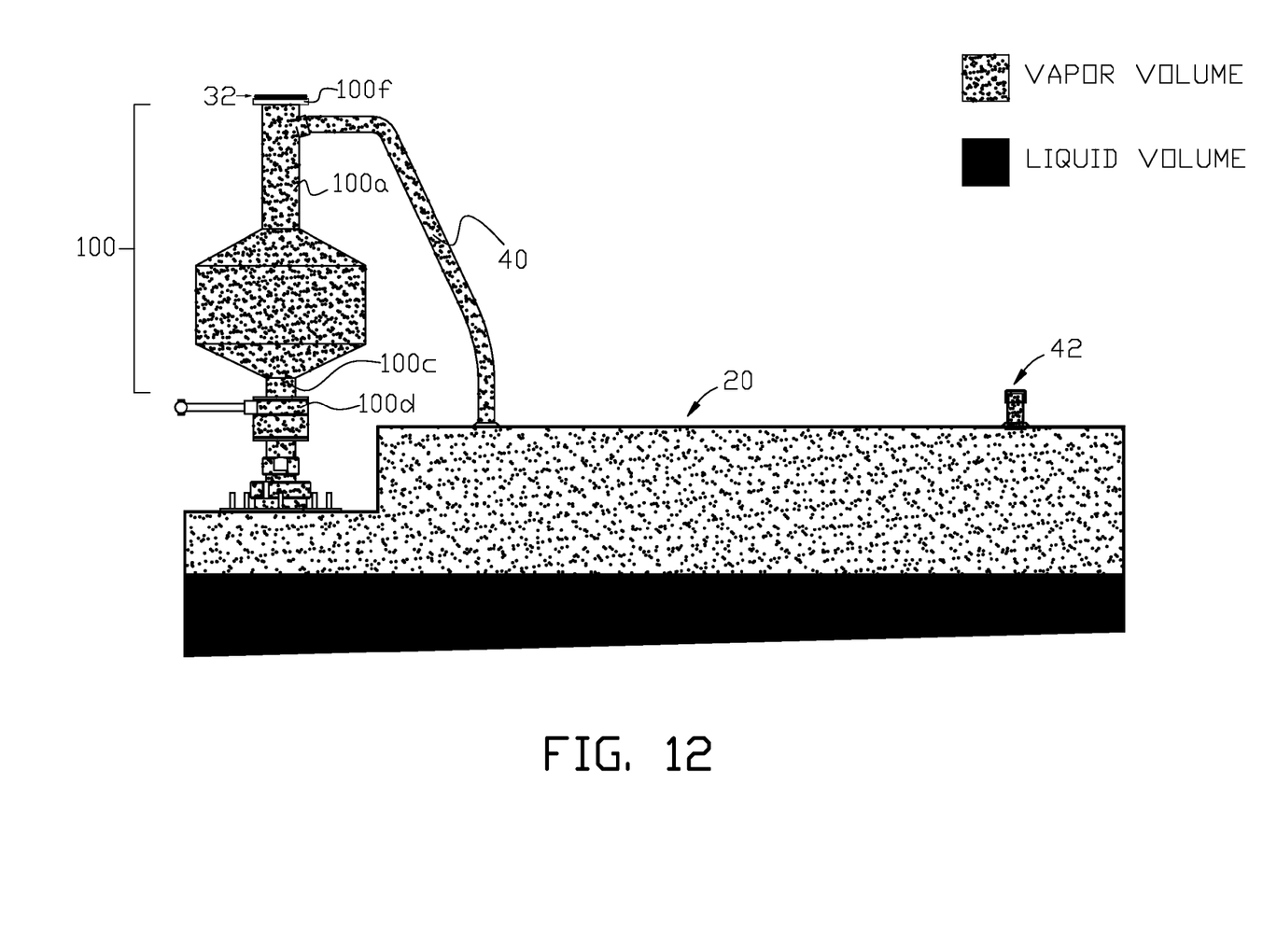
FIG. 12 is a side elevation view of one example of the bottom drain liquid proving system of the present invention illustrating vapor and liquid distribution when the prover is empty and there is liquid in the holding tank.

After each filling of the prover with liquid, the liquid can be drained from the prover by opening drain valve 100d with the distribution of liquid (shown in solid in the figure) and saturated vapor in the prover system of the present invention being as typically illustrated in FIG. 12 after the prover is drained. Since the interior of the prover and holding tank are a closed loop system, vapor saturated air is drawn (suctioned) into the interior prover volume via vapor conduit to replace the drained liquid from the prover. By maintaining the vapor saturated environment, evaporation is effectively restricted.

The prover can be repeatedly used by draining each measured volume of fluid from the prover into the drain tank after being filled until a decision is made to empty the holding tank. At that time, holding tank drain valve 20b (FIG. 4) can be opened to drain the accumulated fluid from the holding tank (with air flowing into the holding tank via air vent 42) typically back into a storage tank supplying liquid to the dispensing pump.

An additional benefit of the liquid vapor proving system of the present invention is that vapors of the liquid are not released in the vicinity of the operator that fills the prover. That is vapors are not released through fill opening 100a' of the prover in which the operator inserts the nozzle from the dispensing meter or pump, or after removal of the nozzle.

For one non-limiting application of the liquid prover system of the present invention each of the three holding tanks 20 shown in FIG. 10 are approximately dimensioned as follows. Each tank has an overall length, l, of approximately 78 inches, an overall width, w, of approximately 15.5 inches, and a height, h. of approximately 17 inches. Ambient air vent 42 is positioned approximately on the centerline ($w_v$ equal to approximately 7.75 inches) of the width of a tank. The horizontal distance from the center of neck 100a of a prover to its associated vent 42, $d_{pv}$, is approximately 60.75 inches. The horizontal distance from the center of neck 100a of a prover to the center of the opening in vent conduit 40 into its associated tank 20, $d_{pvc}$, is approximately 17 inches.

While the above applications of the invention describe liquid dispensing pumps at gas stations and the like, the liquid proving system of the present invention is also of benefit in other applications, particularly where the liquid is highly volatile.

While the above applications of the invention describe inserting a pump's nozzle into the prover, the nozzle may be any type of device for releasing liquid from the apparatus associated with the meter to be calibrated.

The above examples of the invention have been provided merely for the purpose of explanation and are in no way to be construed as limiting of the present invention. While the invention has been described with reference to various embodiments, the words used herein are words of description and illustration, rather than words of limitations. Although the invention has been described herein with reference to particular means, materials and embodiments, the invention is not intended to be limited to the particulars disclosed herein; rather, the invention extends to all functionally equivalent structures, methods and uses. Those skilled in the art, having the benefit of the teachings of this specification, may effect numerous modifications thereto, and changes may be made without departing from the scope of the invention in its aspects.

The invention claimed is:

1. A bottom drain liquid proving system comprising:
   a bottom drain prover comprising an upper neck section, the neck section having a fill opening for receiving a liquid, a central section for accumulating the liquid, and a drain section;
   a gauge in fluid communication with the interior volume of the prover to measure the volume of the liquid in the prover;
   a device for controlling the release of the liquid in the prover;
   a holding tank for receiving the liquid released from the prover;
   a vapor conduit connecting the interior volume of the neck section to the interior volume of the holding tank;
   a prover fill opening self sealing assembly having a self sealing opening that opens when a liquid dispensing nozzle is pushed against the self sealing opening and forms a substantially vapor tight seal around the nozzle; and
   a vent connecting the interior volume of the holding tank to atmosphere.

2. The bottom drain liquid proving system of claim 1 wherein the prover fill opening self sealing assembly comprises an annular disk and an iris diaphragm covering the annulus of the annular disk except when the liquid dispensing nozzle is pushed against the iris diaphragm to penetrate through the annulus into the interior of the neck of the prover.

3. The bottom drain liquid proving system of claim 1 wherein the prover fill opening self sealing assembly comprises a nozzle sealing gasket for forming the substantially vapor tight seal around the nozzle, and a nozzle removed self seal assembly containing a self sealing opening.

4. The bottom drain liquid proving system of claim 3 wherein the nozzle removed self seal assembly comprises an annular disk and a flapper door covering the annulus of the annular disk except when the liquid dispensing nozzle is pushed against the flapper door to penetrate through the annulus into the interior of the neck section of the prover.

5. The bottom drain liquid proving system of claim 4 wherein the flapper door is attached to a self-closing spring loaded spring attached to the annular disk.

6. The bottom drain proving system of claim 3 wherein the prover fill opening self sealing assembly comprises the nozzle sealing gasket inserted in the self sealing opening.

7. The bottom drain liquid proving system of claim 6 wherein the nozzle removed self seal assembly comprises an annular disk and a flapper door covering the annulus of the annular disk except when the liquid dispensing nozzle is pushed against the flapper door to penetrate through the annulus into the interior of the neck section of the prover.

8. A method of measuring a volume of liquid pumped into a bottom drain prover, the method comprising the steps of:
forming a substantially closed volume from the interior of a holding tank, a bottom drain prover drainable into the holding tank and a vapor conduit connected between the prover near a fill opening for pumping the liquid into the prover, and the holding tank to establish a vapor saturated environment in the prover and the holding tank;
inserting a liquid dispensing nozzle through a prover fill self sealable opening in the fill opening; and
pumping a volume of liquid from the dispensing nozzle into the prover whereby release of vapors from the volume of liquid is inhibited due to the vapor saturated environment.

9. The method of claim 8 further comprising the steps of filling the prover with a nominal volume of liquid from the dispensing nozzle as measured by the gauge associated with the prover and resetting the meter associated with the metered dispensing device to the nominal volume.

10. A method of measuring a volume of liquid pumped into a bottom drain prover from a metered dispensing device, the method comprising the steps of:
forming a substantially closed volume from the interior of a holding tank, a bottom drain prover drainable into the holding tank and a vapor conduit connected between the prover near a fill opening for pumping the liquid into the prover, and the holding tank to establish a vapor saturated environment in the prover and the holding tank;
inserting a liquid dispensing nozzle associated with the metered dispensing device through a prover fill self sealable opening in the fill opening;
pumping at least one preliminary volume of liquid from the dispensing nozzle into the prover;
draining the at least one preliminary volume of liquid from the prover into the holding tank;
pumping a nominal volume of liquid from the dispensing nozzle into the prover as measured by the meter associated with the metered dispensing device whereby release of vapors from the nominal volume of liquid is inhibited due to the vapor saturated environment;
measuring the nominal volume of liquid pumped into the prover with a gauge associated with the prover; and
comparing the volume measured by the meter associated with the metered dispensing device and the gauge associated with the prover.

* * * * *